United States Patent

Stimson

[15] 3,689,805
[45] Sept. 5, 1972

[54] EXPOSURE CONTROL
[72] Inventor: Allen Gwyn Stimson, Rochester, N.Y. 14650
[73] Assignee: Eastman Kodak Company, Rochester, N.Y.
[22] Filed: Jan. 18, 1971
[21] Appl. No.: 107,525

Related U.S. Application Data

[63] Continuation of Ser. No. 863,403, Aug. 4, 1969, abandoned.

[52] U.S. Cl..............317/124, 95/10, 317/148.5 R, 317/DIG. 4
[51] Int. Cl...............................................G01j 1/52
[58] Field of Search....95/10 C, 10 CE, 10 CD, 64 R, 95/64 C, 64 D; 323/21; 317/124, 125, 130; 307/117, 331; 250/206, 214; 328/2

[56] References Cited

UNITED STATES PATENTS 3,482,497   12/1969   Ernisse....................95/10 CD

Primary Examiner—J. D. Miller
Assistant Examiner—Harry E. Moose, Jr.
Attorney—W. H. J. Kline and Raymond L. Owens

[57] ABSTRACT

An automatic diaphragm control, in which the transducer which drives the diaphragm, is bypassed by a transistor, the degree of bypass increasing as the diaphragm aperture gets smaller. This is done in order to make the exposure control less sensitive at high light levels, and to give the exposure control a logarithmic sensitivity curve.

5 Claims, 2 Drawing Figures

ALLEN G. STIMSON
INVENTOR.
BY Daniel E. Srago
Robert W Hampton
ATTORNEYS

EXPOSURE CONTROL

This is a continuation of Ser. No. 863,403 filed Aug. 4, 1969, and now abandoned.

BACKGROUND OF THE INVENTION

The present invention relates to exposure controls and more particularly to exposure controls of the type wherein the amount of current through a meter winding determines the diaphragm opening.

Exposure control devices are, of course, well known in the art and are commonly used to control the amount of light admitted to a photographic camera as a function of the intensity of the lighting of the scene to be photographed. Some of these devices include a galvanometer which controls the movement of a diaphragm in response to an electrical signal produced by a photosensitive element which is exposed to the scene to be photographed. The difficulty with this type of exposure control is that it tends to be linear, i.e., it tends to move the diaphragm stop an amount which is directly proportional to the amount of light which is incident on the photocell. This type of linear response is undesirable since the difference in area for one f stop, when the diaphragm is at a large opening, is very large compared to the difference in area corresponding to one f stop when the diaphragm is at a small opening. It is therefore desirable that the photocell-meter combination have a logarithmic response curve.

Attempts made in the prior art to solve this problem have not been entirely successful. One proposed solution has been to provide a non-uniform magnetic stator field for the galvanometer designed so that in the range of high light intensity, where the current supplied by the associated photocell is at a maximum, the galvanometer field will be weakened in order to approximate a logarithmic response.

Another proposed solution involves providing a permanent magnet in the path of the galvanometer rotor to retard the movement of the galvanometer under high intensity lighting conditions.

Both these prior art techniques have certain disadvantages among which are a lack of control and of easy adjustability.

Another solution has been to provide a second photocell which is exposed to the same illumination as the first photocell and acts to bypass the current controlled by the first photocell. This type of arrangement is shown in U.S. Pat. No. 3,028,499 issued Apr. 3, 1962, to Farall. It has the disadvantage, however, of requiring a second photocell.

SUMMARY OF THE INVENTION

It is therefore an object of the present invention to provide a novel exposure control arrangement whereby the movement of the diaphragm has a logarithmic relationship to the amount of illumination of the scene to be photographed, and, further, to achieve this end in a manner which is reliable, efficient and relatively simple and which avoids the shortcomings of the prior art.

These and other objects are achieved through the provision of a control for an exposure control device wherein the amount of current which passes through the meter winding is controlled in accordance with the desired position of the diaphragm stop. More specifically, this current is controlled so that a change in illumination will cause a smaller proportional change of current in the high intensity range than in the low intensity range. In a specific embodiment of the invention a first transistor is connected in shunt across the meter winding. The conductance of the transistor is controlled by a photosensitive cell. The photosensitive cell monitors the lighting of the object area whereby an increase in intensity of the lighting will render the transistor more conductive to increase the shunting or bypassing effect on the meter winding. Thus although the net current through the meter winding will increase with increased illumination, this incremental increase will be reduced in the high intensity range by the shunting effect of the transistor. Thus the reduced incremental movement of the diaphragm required in the range of high light intensity is provided.

In another embodiment, a second transistor which is also controlled by the photosensitive element is connected in series with the meter winding and acts as an amplifier for the photosensitive element. Because of the opposing effects of the two transistors, the current versus illumination curve tends to flatten out in the high intensity range so that the changes in illumination result in relatively small changes in current. By limiting the "flattening" effect to the high intensity range the required relatively large incremental movement of the diaphragm may still be accomplished when the diaphragm is at large apertures.

DESCRIPTION OF THE DRAWING

Other objects and advantages of the invention will be apparent to those skilled in the art from the description of the drawing in which.

DESCRIPTION OF THE PREFERRED EMBODIMENTS

Figure 1:
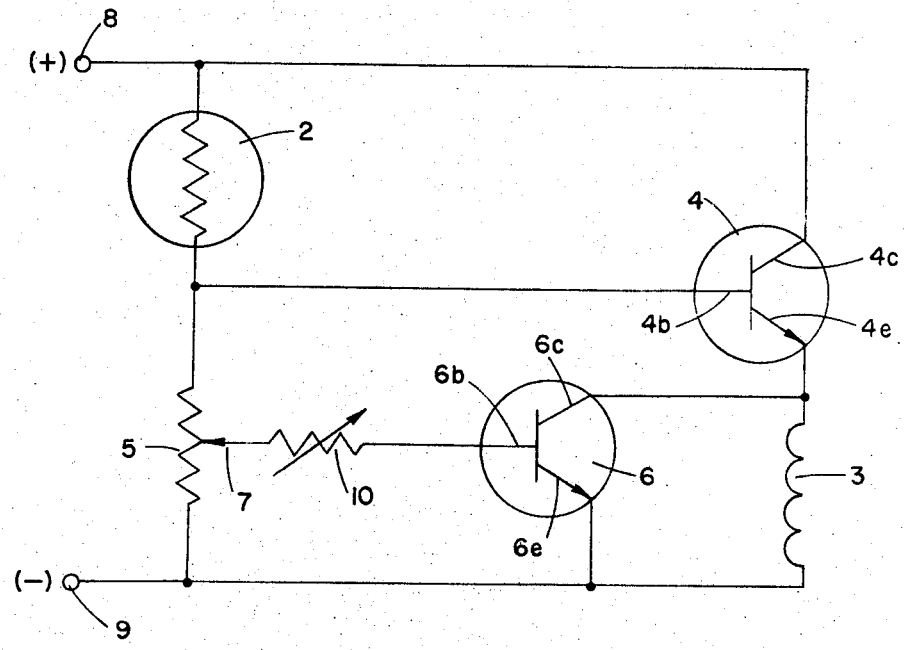
FIG. 1 is a schematic diagram of an exposure control in accordance with the invention using two transistors.

Referring to FIG. 1, there is shown a winding 3 which represents a current coil or winding of a transducer for controlling the diaphragm aperture. This type of transducer controlled diaphragm may be of the type shown, for example, in U.S. Pat. No. 3,033,993 assigned to the same assignees as the present invention. Such systems are well known in the art and need not be further described.

The circuit of the drawing further includes a pair of NPN transistors 4 and 6 which have their bases connected to a light sensitive device shown as photo-conductive element 2. One terminal of photo-conductor 2 is connected to the positive terminal 8 of a D.C. supply while the other terminal of photo-conductor 2 is connected to the base 4b of transistor 4 and to one side of potentiometer 5. The collector 4c of the transistor 4 is connected to the positive terminal 8 of the D.C. supply while the emitter 4e is connected to one side of the meter winding 3. The output tap 7 of potentiometer 5 is connected through a variable resistance 10 to the base 6b of a transistor 6. The collector 6c of transistor 6 is connected to the emitter 4e of transistor 4. The other side of potentiometer 5, the emitter 6e of transistor 6, and the other side of meter winding 3 are all connected to the negative terminal 9 of the D.C. supply.

The device operates as follows: Photo-conductor 2 which is exposed to scene illumination varies its conductivity in response to the illumination that it receives. When the illumination increases, the conductivity of photo-conductor 2 increases. The increase of conductivity of photo-conductor 2 makes the base electrode 4b of transistor 4 more positive, thus increasing the conductivity of transistor 4 and the current through winding 3. However, the same time that the potential on base 4b of transistor 4 is increased, the potential on base 6b of transistor 6 is also increased. This causes the conductivity of transistor 6 to be increased, thus increasing the bypassing effect which transistor 6 has on winding 3. The net result is that at low light levels where the resistance of photo-conductor 2 is fairly high, an incremental change in the conductivity of transistor 4 which will drive a corresponding incremental current through winding 3. The current through winding 3 will not be bypassed through transistor 6 since the resistance of photo-conductor 2 is fairly high, thus keeping the conductivity of transistor 6 fairly low. As the light level increases, the bypassing effect of transistor 6 also increases, thus reducing the incremental effect that a change in illumination on the photo-conductor will have on the winding 3.

The operating point of transistor 6 may be controlled by varying either potentiometer 5 or variable resistor 10. In this way the overall response of the system may be adjusted.

Figure 2:
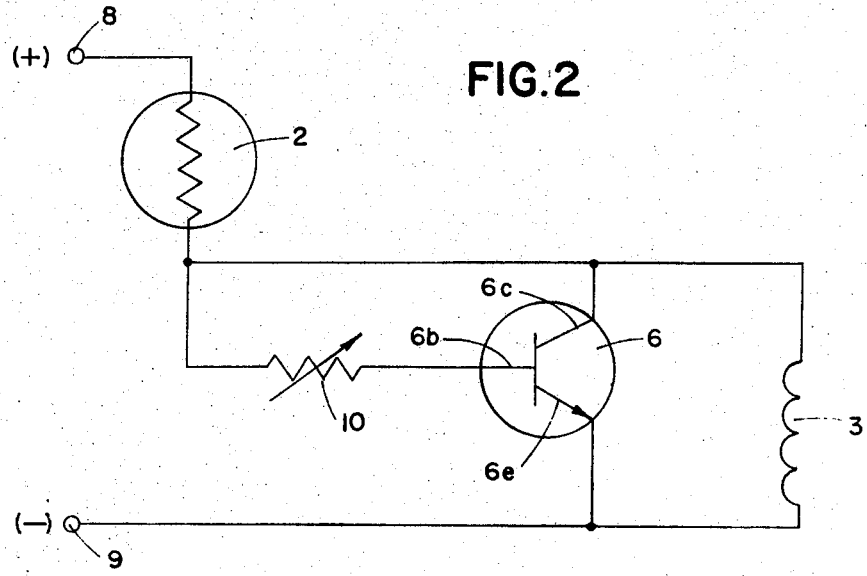
FIG. 2 is a schematic diagram of an exposure control using a single transistor.

It is not necessary that transistor 4 be included in the circuit. If it is desired to eliminate transistor 4, the circuit would take the form shown in FIG. 2, where corresponding parts have been identified with the same number. Here the current through transducer 3 is controlled directly by photoconductor 2. Transistor 6 operates in the same manner as in FIG. 1.

The invention can be used with other light-sensitive devices such as photovoltaic cells, photodiodes, phototransistors and photosensitive field effect transistors.

It will be further appreciated that the invention is not limited to a galvanometer arrangement used to regulate a diaphragm. The invention is also suitable for use in its broader aspects with any light measuring device which uses current flow to automatically operate an indicator of lighting conditions where a non-linear response is desired.

It is to be understood that the transistors could be replaced by any equivalent electronic amplifiers such as vacuum tubes. As is well known, the control terminal of a transistor is its base, whereas the control terminal of a vacuum tube is its grid. The controlled terminals of a transistor are the emitter and collector, whereas the controlled terminals of a vacuum tube are its cathode and anode.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In exposure control apparatus for adjusting the flow of current through a transducer as a function of the intensity of scene illumination, the combination comprising:
    a. photosensitive means having an electrical parameter which varies as a function of the intensity of scene illumination;
    b. means defining a first circuit serially coupled to the transducer;
    c. means for varying the current flow in said first circuit as a function of the magnitude of the parameter of said photosensitive means;
    d. means defining a second circuit coupled to said first circuit to provide a bypass around the transducer; and
    e. means responsive non-linearly to variations in the magnitude of the parameter of said photosensitive means for varying the flow of current in said second circuit to thereby adjust the flow of current through the transducer.

2. In exposure control apparatus for adjusting the flow of current through a transducer as a function of the level of scene illumination, the combination comprising:
    a. photosensitive means connected in series with the transducer and having a parameter which varies as a function of the intensity of scene illumination for varying current in said transducer as a function of variations in the magnitude of the parameter of said photosensitive means;
    b. means defining a circuit coupled to provide a bypass around the transducer; and
    c. means responsive non-linearly to variations in the magnitude of the parameter of said photosensitive means for varying the current in said coupled circuit means to thereby adjust the flow of current through the transducer.

3. For use in a camera adapted to expose a photosensitive medium to illumination from a scene, and having a source of electric current, an exposure control apparatus comprising:
    a. electrically energizable transducer means for regulating the exposure of the photosensitive medium to the scene;
    b. means for coupling the source of current to said transducer means for energization thereof;
    c. photoelectric means for varying the energization of said transducer means in accordance with scene brightness, said photoelectric means having first and second terminals;
    d. a first transistor having base, emitter, and collector electrodes, said collector and emitter electrodes being coupled in shunt with said transducer;
    e. a potentiometer coupled to the base electrode of said first transistor;
    f. a second transistor having base, emitter, and collector electrodes, said collector and emitter electrodes being coupled in series with said transducer means; and
    g. means for coupling said second terminal of said photoelectric means to said potentiometer and to the base electrode of said second transistor to vary the current through said first and second transistors in response to scene brightness.

4. An exposure control apparatus for regulating the flow of current through an electrically energizable operable transducer in response to illumination, said exposure control comprising:

a. a photoelectric cell, the current flow through which is related to the level of illumination incident thereon;

b. a first transistor having emitter, collector and base terminals, said emitter and collector terminals being coupled in shunt across said transducer, and said base terminal being coupled to said photoelectric cell for decreasing the response of the transducer to the photoelectric cell at high levels of illumination by variably bypassing current around the transducer in accordance with the illumination incident on said photoelectric cell; and c. a second transistor having collector, emitter and base terminals, said emitter and collector terminals being coupled in series with said transducer and said base terminal being coupled to said photoelectric cell whereby said second transistor is effective to amplify the output of the cell.

5. An exposure control apparatus for regulating the flow of current through an electrically operable transducer in response to illumination, said exposure control comprising:

a. photoelectric means connected in series with said transducer for varying the flow of current through the transducer in accordance with illumination on said photoelectric means; and b. a transistor having emitter, collector and base terminals, said emitter and collector terminals being coupled in shunt across the transducer, and said base terminal being coupled to said photoelectric means for decreasing the response of the transducer to the photoelectric means at high levels of illumination by variably bypassing current around the transducer in accordance with the illumination incident on said photoelectric means.

* * * * *